United States Patent [19]

Reid

[11] 4,277,302
[45] Jul. 7, 1981

[54] APPARATUS FOR ADVANCING SHEET MATERIAL

[76] Inventor: Philip Reid, Rte. 2, Box 422, Duncan, S.C. 29334

[21] Appl. No.: 74,140

[22] Filed: Sep. 7, 1979

[51] Int. Cl.³ .............................................. B29D 23/10
[52] U.S. Cl. ...................................... 156/466; 53/551; 156/203
[58] Field of Search ............................... 156/203, 466; 53/550–552, 291, 292, 296, 297; 93/82; 226/166, 167

[56] References Cited

U.S. PATENT DOCUMENTS

| | | | |
|---|---|---|---|
| 2,657,933 | 11/1953 | Stuebner | 226/166 X |
| 3,086,335 | 4/1963 | Frank | 53/551 |
| 3,583,126 | 6/1971 | McCollough | 53/551 X |

*Primary Examiner*—David A. Simmons
*Attorney, Agent, or Firm*—Bailey, Dority & Flint

[57] ABSTRACT

A device for feeding thin plastic film to and around a mandrel for forming a tubular package in which articles are deposited. The sheet material is advanced downwardly over the mandrel by means of a reciprocating collar which includes a unidirectional driving member. The tubular formed sheet material is cut and sealed by conventional sealing devices.

6 Claims, 7 Drawing Figures

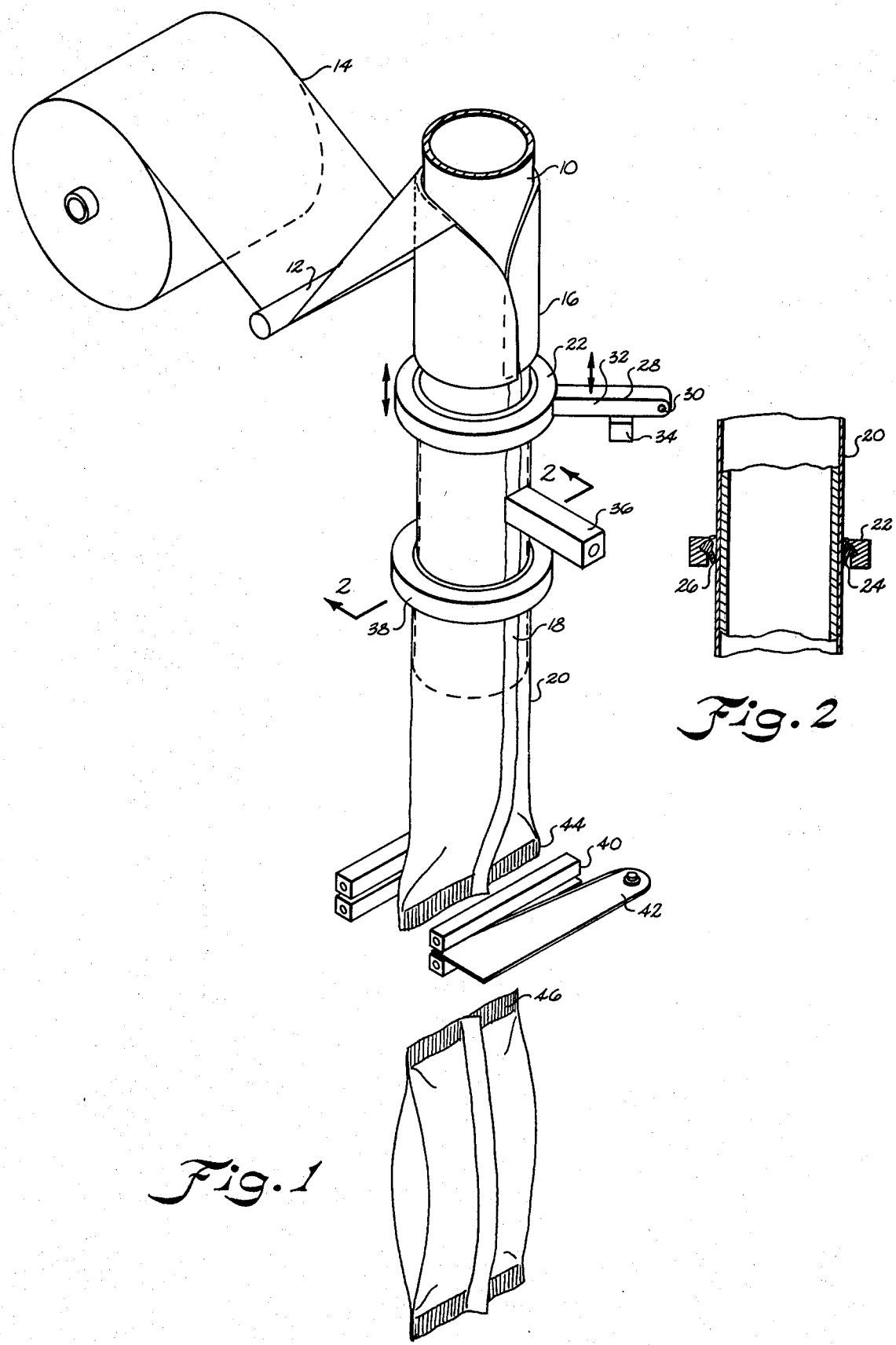

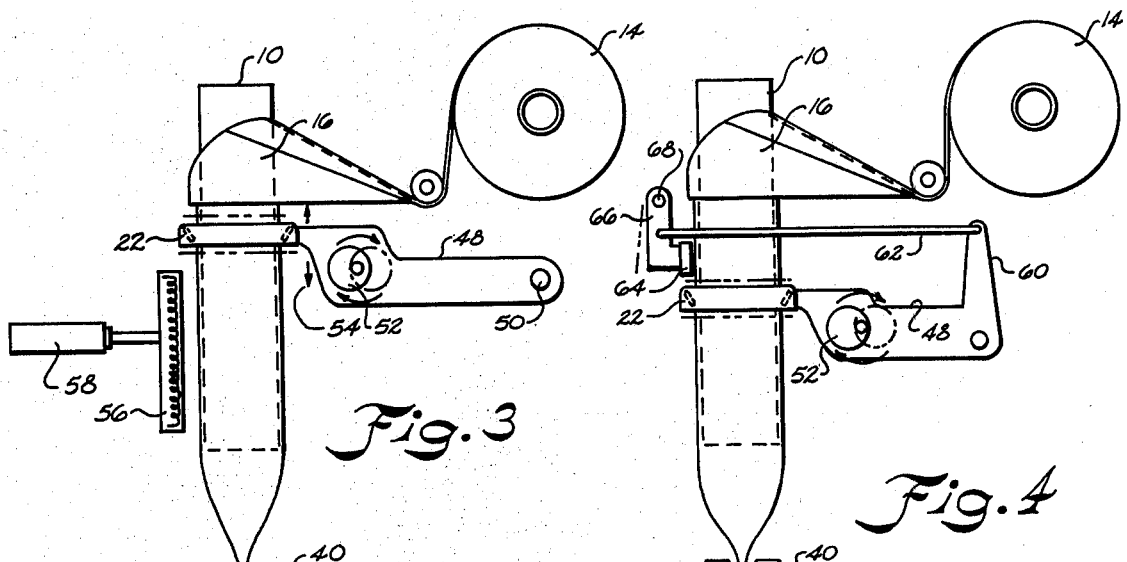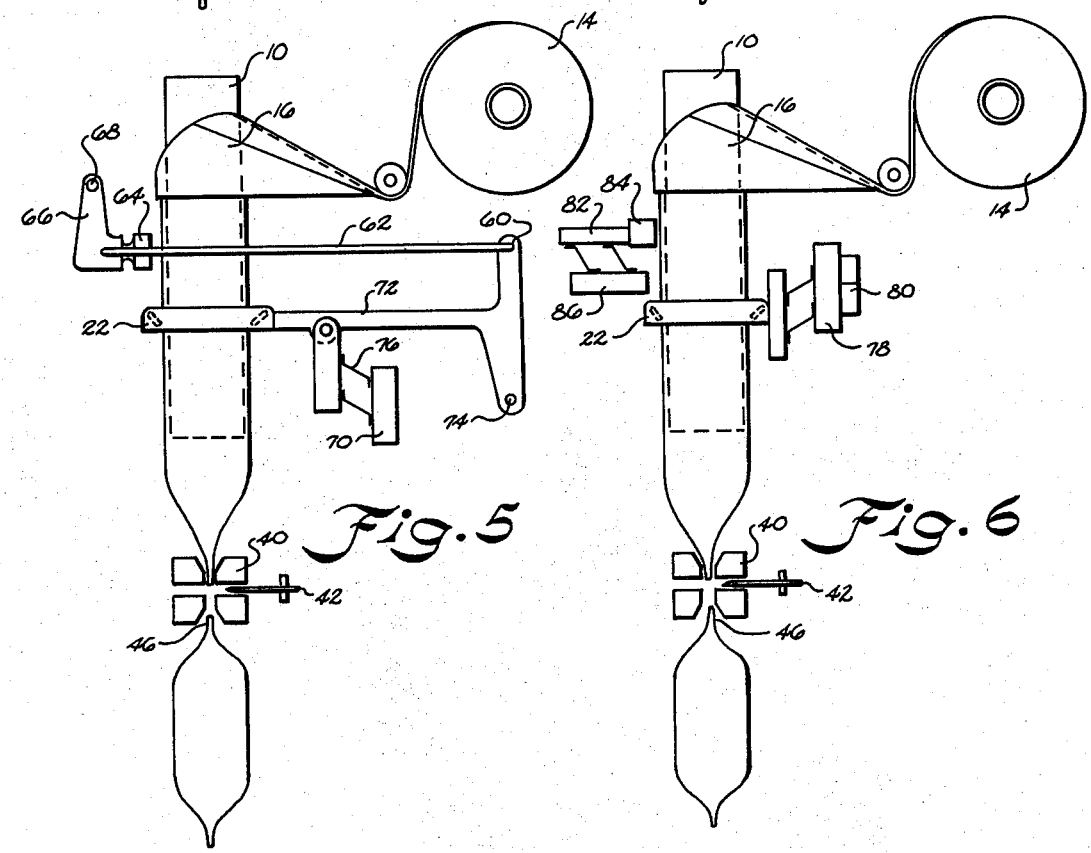

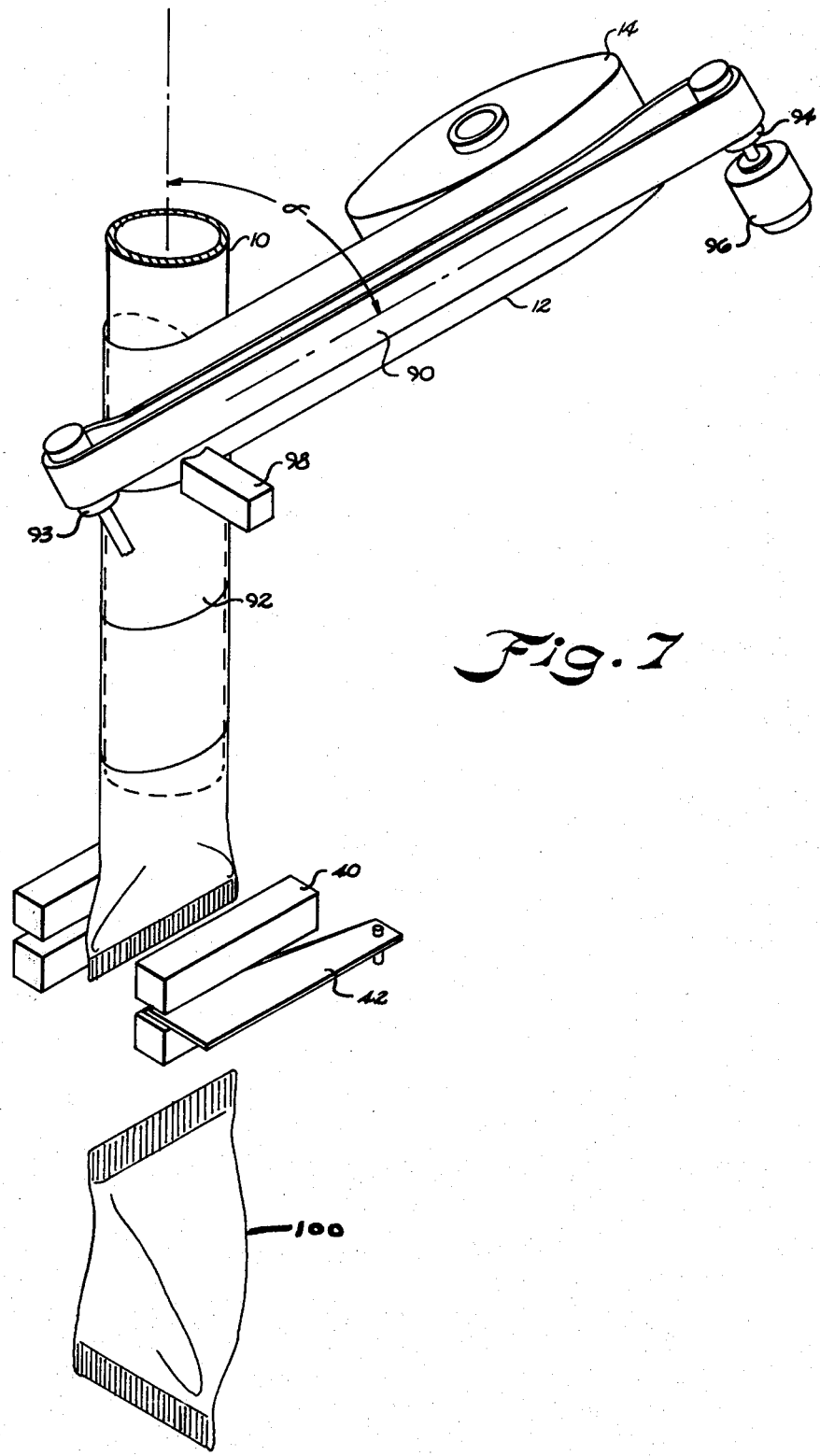

APPARATUS FOR ADVANCING SHEET MATERIAL

BACKGROUND OF THE INVENTION

Heretofore in packaging machines sheet material such as thin plastic material is fed from a roll of sheet material over and around an elongated vertically extending mandrel. The sheet material is shaped in the form of a tubular member by means of a forming collar and is advanced along the tubular mandrel by means of belts or reciprocating end seal jaws. One problem with utilizing elongated belts is that it increases the height of the overall machine and produces a substantial product drop height through the mandrel into the package when filling the package formed thereon. An example of such a package forming and filling machine is disclosed in U.S. Pat. No. 3,792,724.

Another typical bag forming and filling machine is disclosed in U.S. Pat. No. 4,077,308. In each of the above devices, a sealing mechanism is provided for sealing the overlapping or face to face side seam of the tubular member being formed on the mandrel. Each of the devices are also equipped with a cutter and end sealing devices which seal the package according to a predetermined length. The cutter and end sealing devices may be activated in any suitable conventional means such as by photoelectric detecting devices that sense targets printed on the package.

SUMMARY OF THE INVENTION

The invention relates to a package forming device and more particularly to a device for advancing thin film plastic material along a mandrel while forming tubular packages.

The apparatus includes a tubular mandrel over which a tubular web of thin plastic material is formed by means of a former or similar device. As the sheet material is fed from a roll of sheet material through the former, it is advanced by a unidirectional driving means carried in a collar that is concentrically positioned on the tubular mandrel. The collar in which the unidirectional driving means is carried in one particular embodiment is pivotally supported on a pivot arm. The pivot arm is reciprocally moved in an axial direction to the mandrel advancing the tubular sheet material each time it moves in a forward direction. The unidirectional driving means when moved in the opposite direction slides over the surface of the sheet material. In one particular embodiment the unidirectional driving means takes the form of a conical shaped oil seal made of flexible material such as rubber which grips the sheet tubular material advancing the material when moved in the downward or forward direction and slides over the sheet of tubular material when moved in the opposite direction. A heat sealing device is utilized for sealing the overlapping seams of sheet material as it is advanced over the surface of the tubular mandrel. The heat sealing device may be any suitable conventional sealing device, however, in one particular embodiment its operation is synchronized with the movement of the unidirectional driving means so that the seal comes in contact for sealing the edges of the tubular member when the unidirectional driving means is sliding back over the stopped tubular sheet material.

Positioned directly below the tubular mandrel is a conventional end sealing mechanism and package severing mechanism which seals and cuts the end of the tubular packages once formed on the mandrel.

Accordingly an important object of the present invention is to provide a device for forming tubular packages which have a relatively short forming length and a relatively short product drop height.

Another important object of the present invention is to provide a relatively simple and reliable device for advancing sheet material over a mandrel for forming tubular packages and the like.

These and other objects and advantages of the invention will become apparent upon reference to the following specifications, attendant claims and drawings.

BRIEF DESCRIPTION OF THE DRAWINGS

FIG. 1 is a perspective view illustrating a portion of a bag forming device constructed in accordance with the present invention, FIG. 2 is a sectional view taken along line 2—2 of FIG. 1, FIG. 3 is a planned view illustrating one means of vibrating a sheet advancing collar, FIG. 4 is a side elevational view of an apparatus for synchronizing a sealing and advancing mechanism for the bag forming device, FIG. 5 is an elevational view of still another modified form of the invention, FIG. 6 is an elevational view of still another modified form of the invention, and FIG. 7 is a perspective view illustrating an apparatus for coiling a tubular package on a mandrel and sealing the edges thereof.

DESCRIPTION OF A PREFERRED EMBODIMENT

Referring in more detail to FIG. 1 of the drawings, there is illustrated a tubular mandrel 10 which forms part of a conventional package filling machine. In package filling machines such as disclosed in U.S. Pat. Nos. 3,792,274 and 4,077,308 a tubular package is formed around a tubular mandrel and is advanced along the length of the mandrel by means of belts.

Adjacent to the bottom of the tubular mandrel are suitable conventional sealing and cutting devices for cutting the tubular packages into predetermined lengths. The side sealing mechanisms are carried adjacent the tubular mandrel for sealing the edges of the bags.

The articles are loaded into the bag through the tubular mandrel 10 prior to sealing the tops thereof. In these conventional devices, a former is carried adjacent to the top of the mandrel for forming the sheet material around the circumference of the tubular mandrel with the edges of the sheet material overlapping so that they can be suitably sealed.

Referring back to FIG. 1, the sheet material 12 may be any suitable heat sealable material such as polyethylene which is fed from a supply roll 14 to a former 16. The former 16 may be any conventional former wrapping the sheet material around the tubular mandrel 10 with the edges overlapping or face to face. As the sheet material passes downwardly through the former, it is tubular in shape with edges provided as indicated by the reference character 18.

In order to advance the tubular plastic member 20, a reciprocating collar 22 is concentrically mounted relative to the tubular mandrel 10 so that as it is moved to and fro or up and down it advances the tubular package 20 downwardly. The collar 22 has a conical shaped oil seal 24 carried therein which includes a flange portion 26 as illustrated in FIG. 2 that is inclined downwardly toward the mandrel in the direction of advancement of the sheet material. As a result, as the collar is shifted downwardly the end of the flanges 26 engage the plastic material shifting the plastic material downwardly. When the collar 22 is raised during the reciprocating cycle the flange 26 rides over the surface of the sheet material.

The collar 22 in one particular embodiment is supported on a pivotal arm 28 which is pivoted above a point 30. The arm 28 is pivoted up and down as indicated by the arrows by any suitable means such as a directional vibrator 34. Other suitable means could be utilized for vibrating the collar 22 to and fro and examples of some such devices are disclosed fully below.

Positioned adjacent the aligned edges of the sheet material which are to form the seal 18 of the tubular member is a sealing device 36 which may be any suitable sealing device such as a heat sealing member that upon applying heat to the edges presented, seals the edges together forming a tube. The details of the sealing member 36 are not illustrated since it could be any suitable conventional heat sealing mechanism.

A second collar 38 may be in one embodiment constructed in accordance with the invention concentrically carried on the mandrel 10 and spaced downstream from the upper collar 22. In some situations, the second collar 38 is desirable for aiding in holding the sheet material as the first collar 22 is raised. The second collar 38 would have a similar oil type seal 24 provided therein which includes a flange 26 that engages the surface of the plastic material.

It is also contemplated within the subject invention to synchronize the movement of the second collar 38 with the movement of the first collar 22 so that they will be 180 degrees out of phase in order to produce a continuous advancement of the sheet material downwardly over the mandrel. Of course the second collar would have to be suitably mounted on a pivotal arm similar to the first collar 22.

Positioned adjacent the bottom of the tubular mandrel 10 is a conventional sealing device 40 and cutter 42, both of which are shown schematically. The sealer 40 may be activated by any suitable conventional manner for heat sealing the package for forming a bottom edge 44 on the package being formed on the mandrel and a top edge 46 on the package being previously formed. The cutter 42 cuts between the bottom edge 44 and the top edge 46 of the package separated from the tubular member 20. Normally, the operation of the sealing mechanism 40 and the cutter 42 is activated by a registration mark imprinted on the plastic sheet 12 and sensed by a photoelectric cell. However, it is to be understood that they could be activated by any length determining mechanism, such as by counting collar oscillations or an appropriately positioned limit switch.

As a result of the collar 22 advancing the sheet material substantially continuously over the mandrel 10, the cutting and sealing mechanism 42 and 40 can be positioned closely adjacent the bottom of the mandrel 10 thus minimizing the product drop height through the mandrel 10 and also the overall height of the tubular package forming mechanism.

Referring now to FIG. 3 of the drawings there is illustrated a device for reciprocally shifting the collar 22 up and down on the mandrel for advancing the sheet material downwardly thereon. The collar 22 is in turn supported on a pivotal arm 48 which is allowed to pivot about point 50. Carried on the pivotal arm is an eccentric 52 that is driven by any suitable means that in turn causes the pivotal arm 48 to pivot up and down as indicated by the arrows 54. This pivotal movement is imparted to the collar 22 since the collar is directly connected to the end of the arm. As a result, the sheet material is advanced downwardly responsive to the reciprocal movement of the pivotal arm in 48 and collar 22.

In FIG. 3 the side heat sealing device 56 is provided for sealing the overlapping edges of the sheet material as it passes down over the mandrel. A cylinder 58 is provided for bringing the heat sealing device 56 into contact with the edges responsive to being triggered. The advancement of the sheet material should normally be stopped when applying the seal to the edge.

In order to produce a continuous bag forming and sealing operation, a device such as illustrated in FIG. 4 can be utilized. In this particular device, connected to the pivotal arm 48 is an upwardly extending lever 60 that is in turn connected by means of a linkage 62 to a side heat sealing device 64. Beside heat sealing device 64 is in turn carried on a pivotal arm 66 that pivots about point 68. As a result when the collar 22 is being shifted downwardly the heat sealing device 64 is moved out of contact with the edges of the tubular sheet. However, when the collar 22 is being raised by the reciprocating eccentric 52, the sealing device 64 is pivoted about the point 68 into contact with the edges of the sheet material sealing the edges of the tube.

In FIGS. 4 and 5 the side seal 64 contacts the sheet material when the collar 22 is sliding upwardly on the end forming tube 10. As a result, it seals the film edges also acts as a brake preventing the sheet material from being raised with the collar 22 on the upstroke. The side seal 64 is retracted when the collar 22 is reciprocated downwardly. In FIG. 5, a vibrator 70 oriented in the vertical direction is utilized for reciprocating the arm 72 in a vertical direction. As the arm 72 is reciprocated, it pivots about point 74 causing the collar 22 to be raised and lowered therewith. The linkage 62 is connected to the upward extending portion of the pivotal arm 72 in the same manner as previously described in connection with the embodiment of FIG. 4. The vibrator 70 is resiliently mounted on leaf springs 76 so as to permit the collar 22 to vibrate up and down when connected to an appropriate power source.

In FIG. 6 the single vibrator 78 is utilized for reciprocatingly moving the collar 22 in the vertical direction. The vibrator 78 is resiliently supported on any suitable fixed member 80. A similar reciprocating vibrator 82 is mounted in the horizontal direction on a support 84. The position on the end of the vibrator 82 is a heat sealing device 86 which seals the side edges of the tubular member as it is brought in contact with the web. The vibrators 82 and 70 are synchronized relative to each other so that when the web material is being advanced as a result of the downstroke of the vibrator 78, the vibrator 82 moves the sealing device 86 out of contact with the overlapping edges. However, when the vibrator 78 is raising the collar 22, the sealing device is brought in contact with the edges of the web material.

In FIG. 7, the sheet material 12 is advanced from the supply roll 14 by means of an endless conveyor belt 90 for spirally wrapping the sheet material around the tubular member 10 with the edges overlapping or folded face to face as at 92. The diameter of the package is determined by the mandrel and the amount of sheet material employed is controlled by the angle α when the sheet material is spirally would relative to the mandrel 10. The conveyor belt 90 which controls this angle is supported between a pair of rollers 93 and 94. Roller 94 is driven by any suitable means such as an electric motor 96. A side sealing device 98 is positioned adjacent to the spiraled edges of the package material for sealing them and forming a tubular member.

Spirally wrapping the film 12 around the tubular mandrel 10 not only eliminates the need for a conventional former but also reduces the product drop height by the vertical length of such a former. The number of degrees of rotation of the spiraling film relative to the end sealing 40 and cutting 42 mechanisms can determine the configuration of the finished package by manipulating said mechanisms in any conventional and suitable manner. For example, if 360 degrees of rotation occurs, a flat or pillow-shaped package will result; if 270 degrees of rotation occurs, a tetrahedral package 100 will occur. Tetrahedral packages are often desirable because they allow considerably more product to be enclosed with the same amount of film used for a comparable length flat or pillow-shaped package.

While a preferred embodiment of the invention has been described using specific terms, such description is for illustrative purposes only, and it is to be understood that changes and variations may be made without departing from the spirit of scope of the following claims.

What is claimed is:

1. An apparatus for advancing thin flexible sheet material over a cylindrical mandrel, comprising:
   means for feeding said sheet material in a tubular configuration longitudinally over said mandrel;
   a collar concentrically carried on said mandrel with said sheet material passing between said collar and said mandrel;
   a unidirectional driving means carried by said collar engaging said sheet material passing between said collar and said mandrel;
   means for reciprocally moving said unidirectional driving means to and fro longitudinally relative to said mandrel advancing said sheet material over said mandrel; and
   said unidirectional driving means comprises a flange member inclined towards the mandrel in the desired direction of advancement of said sheet material engaging said sheet material and advancing sheet material when moved forward over said mandrel and said flange member sliding over said sheet material when moved backward over said mandrel.

2. The apparatus as set forth in claim 1 further comprising:
   a second collar carried on said mandrel spaced from said other collar in the direction of flow of said sheet material;
   unidirectional gripping means carried by said second collar permitting said sheet material to shift freely thereunder in one direction and retarding the movement of said sheet material in the opposite direction.

3. An apparatus for producing tubular material from a flexible sheet material by sealing edges of said sheet material as said material is fed over a mandrel, comprising:
   means for feeding said sheet material in a tubular configuration longitudinally over said mandrel with said edges aligned with each other;
   a collar concentrically carried on said mandrel with said sheet material passing between said collar and said mandrel;
   a unidirectional driving means carried by said collar engaging said sheet material passing between said collar and said mandrel;
   means for reciprocally moving said unidirectional driving means to and fro longitudinally relative to said mandrel advancing said sheet material over said mandrel;
   seal means synchronized with the advancing of said sheet material sealing said aligned edges of said sheet material; said unidirectional driving means including,
   (i) a conically shaped flexible member carried by said collar concentric to said mandrel with a small diameter end engaging said sheet material, said conically shaped flexible member being inclined towards said mandrel in the desired direction of advancement of said sheet material,
   (ii) said small diameter end sliding freely over said sheet material when moved in one direction and engaging said sheet material shifting sheet material axially on said mandrel when moved in the opposite direction.

4. The apparatus as set forth in claim 3 wherein said means for reciprocally moving said unidirectional driving means comprises:
   a pivotal arm connected to said collar; and
   means for pivoting said arm forward and backward for reciprocally moving said unidirectional driving means for advancing said sheet material.

5. The apparatus as set forth in claim 4 wherein said means for pivoting said arm comprises a directional vibrator.

6. Apparatus as set forth in claim 4 wherein said seal means synchronized with the advancing of said sheet material further comprising:
   a heat sealing member;
   means connecting heat sealing member to said pivotal arm for sealing said edges of said sheet material as said pivotal arm is moved backward and moving said heat sealing member out of contact with said edges when said pivotal arm is moved forward.

* * * * *